United States Patent [19]

Polizzotti et al.

[11] Patent Number: 5,512,636
[45] Date of Patent: Apr. 30, 1996

[54] CATIONIC GRAFT POLYMER AGGLOMERATION AGENTS FOR MINERAL BEARING ORES

[75] Inventors: David M. Polizzotti, North Yardley; Wen P. Liao, Warminster, both of Pa.; Donald C. Roe, Burlington, N.J.

[73] Assignee: Betz Laboratories, Inc., Trevose, Pa.

[21] Appl. No.: 301,454

[22] Filed: Sep. 6, 1994

[51] Int. Cl.$^6$ .............................. C08F 265/10; C22B 3/16
[52] U.S. Cl. ...................... 525/285; 525/291; 525/293; 525/296; 525/301; 525/303; 525/308; 75/723; 75/743; 423/27; 423/29; 423/270
[58] Field of Search ......................... 75/723, 743; 423/27, 423/29, 270; 526/303.1, 307; 525/285, 291, 293, 296, 301, 303, 308

[56] References Cited

U.S. PATENT DOCUMENTS

| | | | |
|---|---|---|---|
| Re. 28,474 | 7/1974 | Anderson et al. | 260/29.6 |
| Re. 28,576 | 10/1975 | Anderson et al. | 260/29.6 |
| 3,284,393 | 11/1966 | Vanderhoff et al. | 260/29.6 |
| 3,920,599 | 11/1975 | Hurlock et al. | 260/29.64 |
| 3,968,037 | 7/1976 | Morgan et al. | 210/47 |
| 4,077,930 | 3/1978 | Lim et al. | 260/29.6 |
| 4,147,681 | 4/1979 | Lim et al. | 260/29.6 |
| 4,439,580 | 3/1984 | Schaper | 524/801 |
| 4,705,672 | 11/1987 | McCurdy et al. | 423/3 |
| 4,751,259 | 6/1988 | Roe et al. | 524/405 |
| 4,864,007 | 9/1989 | Schleusener | 526/218.1 |
| 4,875,935 | 10/1989 | Gross et al. | 75/117 |
| 4,898,611 | 2/1990 | Gross | 75/3 |
| 5,077,021 | 12/1991 | Polizzotti | 423/27 |
| 5,077,022 | 12/1991 | Polizzotti | 423/29 |
| 5,100,631 | 3/1992 | Gross | 423/29 |
| 5,112,582 | 5/1992 | Polizzotti | 423/27 |
| 5,182,331 | 1/1993 | Liao et al. | 525/294 |
| 5,186,915 | 2/1993 | Polizzotti | 423/29 |
| 5,196,052 | 3/1993 | Gross et al. | 75/712 |
| 5,211,854 | 5/1993 | Liao et al. | 210/734 |

OTHER PUBLICATIONS

Lin, Y. Q.; Butler, G. B. "Syhthesis of graft copolymers from diallyldimethylammonium chloride and acrylamide" J. Macromol. Sci. (1989), A26(4), 681–92.

Lin, Y. Q.; Pledger, H.; Butler, G. B. "Synthesis and Characterization of Poly(Diallyldimethylammonium chloride–-g–Acrylamide", J. Macromol. Sci. (1988), A25(8), 999–1013.

Primary Examiner—Thomas Hamilton, III
Attorney, Agent, or Firm—Alexander D. Ricci; Steven D. Boyd

[57] ABSTRACT

Agglomerating agent and method for use in heap leaching of mineral bearing ores. Cationic polymers alone or in combination with cement or lime are highly effective agglomerating agents in acidic or alkaline leaching operations. The cationic polymers are preferably graft copolymers, block copolymers or linear copolymers of acrylamide and diallyl dimethyl ammonium chloride.

12 Claims, No Drawings

CATIONIC GRAFT POLYMER AGGLOMERATION AGENTS FOR MINERAL BEARING ORES

FIELD OF THE INVENTION

The present invention relates to agglomerating agents applied to mineral bearing ores to be subjected to leaching recovery operations. The agglomerating agents of the present invention aid in the agglomeration of mineral bearing ore containing fines to allow effective heap leaching for mineral recovery.

BACKGROUND OF THE INVENTION

In recent years, the use of chemical leaching to recover minerals from low grade mineral bearing ores has grown. For example, caustic cyanide leaching is used to recover gold from low grade ores having about 0.02 ounces of gold per ton and dilute sulfuric acid is used to recover copper from copper bearing ores. Such leaching operations are typically carried out in large heaps. The mineral bearing ore from an open pit mine, or other source, is crushed to produce an aggregate that is coarse enough to be permeable in heaps but fine enough to expose the mineral values to the leaching solution. After crushing, the ore is formed into heaps on impervious leach pads. The leaching solution is evenly distributed over the top of the heaps by sprinklers, wobblers, or other similar equipment. As the barren leaching solution percolates through the heap, it dissolves the minerals contained in the ore. The liquor collected by the impervious leach pad at the bottom of the heap is recovered and this "pregnant solution" is subjected to a mineral recovery operation. The leachate from the recovery operation is held in a barren pond for reuse.

Economical operation of such heap leaching operations requires that the heaps of crushed ore have good permeability after being crushed and stacked so as to provide good contact between the ore and the leachate. Ores containing excessive quantities of clay and/or fines (i.e., 30% by weight of $^-100$ mesh fines) have been found undesirable due to their tendency to slow the percolation flow of leach solution. Slowing of the percolation flow of the leach solution can occur when clay and/or fines concentrate in the center of the heap while large rock fragments tend to settle on the lower slopes and base of the heap. This segregation is aggravated when the heap is leveled off for installation of the sprinkler system that delivers the leach solution. This segregation results in localized areas or zones within the heap with marked difference in permeability. The result is channeling where leach solution follows the course of least resistance, percolating downward through the course ore regions and bypassing or barely wetting areas that contain large amounts of clay and/or fines. Such channeling produces dormant or unleached areas within the heap. The formation of a "slime mud" by such fines can be so severe as to seal the heap causing the leach solution to run off the sides rather than to percolate. This can require mechanical reforming of the heap. The cost of reforming the heaps which can cover 160 acres and be 200 feet high negates the economies of scale that make such mining commercially viable.

In the mid 1970s, the United States Bureau of Mines determined that ore bodies containing high percentages of clay and/or fines could be heap leached if the fines in the ore could be agglomerated. The Bureau of Mines developed an agglomeration process in which crushed ore is mixed with Portland cement at the rate of from 10 to 20 pounds per ton, wetted with 16 to 18% moisture (as water or leach solution), agglomerated by a disk pelletizer and cured for a minimum of eight hours before being subjected to stacking in heaps for the leaching operation.

In commercial practice, the method developed by the United States Bureau of Mines has not met with widespread acceptance because of the cost and time required. However, the use of cement, as well as other materials, as agglomerating agents is known. Agglomerating practices tend to be site specific and non-uniform. Typically, the action of the conveyors which move the ore from the crusher to the ore heaps or the tumbling of ore down the conical piles is relied on to provide agglomeration for a moistened cement-ore mixture. Lime has been found to be less effective than cement in controlling clay fines, it is believed this is because the lime must first attack the clay lattice structure in order to provide binding.

Cement has been found to be most effective in high siliceous ores (crushed rock) and noticeably less effective in ores having a high clay content. The large volumes of cement required also present problems. The transportation to and storage of large volumes of dusty cement at the often remote mine locations is difficult. With the growth of such mining methods, the need for cost effective, efficient agglomerating materials has grown.

U.S. Pat. Nos. 5,077,021 and 5,077,022 disclose agglomerating agents and methods for use in heap leaching which comprise anionic polymers of acrylamide and acrylic acid.

U.S. Pat. No. 4,875,935 discloses a method for extracting copper from copper minerals which employs an agglomerating agent comprising anionic acrylamide polymers containing at least five mole percent of carboxylate or sulfonate groups. U.S. Pat. Nos. 4,898,611 and 5,100,631 disclose improvements in the agglomeration of a gold or silver ore with cement comprising including specific water soluble vinyl polymers in the cement agglomeration treatment.

U.S. Pat. Nos. 5,112,582 and 5,186,915 disclose agglomerating agents and methods for using heap leaching of mineral bearing ores which comprises an anionic polymer of acrylamide and acrylic acid and sufficient lime to provide a pH of from about 9.5 to 11.

SUMMARY OF THE INVENTION

The present invention is directed toward new and improved agglomerating agents for use in heap leaching of mineral bearing ores. More specifically, the present invention is directed toward a new agglomerating agent comprising cationic polymers. The cationic polymers may be used in combination with cement or lime. The agglomerating agent of the present invention may be employed in acidic or alkaline leaching operations. Preferably, the agglomerated agents of the present invention are cationic graft copolymers, cationic block copolymers or cationic copolymers of acrylamide and diallyl dimethyl ammonium chloride (DADMAC). It was discovered that such cationic polymers alone or in combination with cement or lime are effective agglomerating agents in acidic or alkaline heap leaching operations.

The effectiveness of the agglomerating agents of the present invention was determined in submersion/dispersion testing at low pH (pH 2.0) and high pH (pH 10.7). The submersion/dispersion test measures the weight of fines washed from an agglomerate after a three minute submersion period. The water used in the tests was pH adjusted using sulfuric acid (pH 2.0) and lime (pH 10.7) for the acidic and alkaline tests respectively. The samples to be tested were agglomerated in a laboratory drum type agglomerator.

DETAILED DESCRIPTION OF THE PREFERRED EMBODIMENTS

The present invention provides a new agglomerating agent for use in heap leaching of mineral bearing ores. It has been discovered that cationic graft copolymers, cationic block copolymers and cationic copolymers of acrylamide and DADMAC are effective agglomerating agents under both acidic and alkaline conditions. The cationic copolymers can be used in combination with known agglomerating agents such as cement or with pH control agents such as lime.

To allow comparison of the efficiency of the agglomerating agents of the present invention when applied to different ores, standardized testing procedures were developed. These procedures allow the efficiency of the various agglomerating agents to be compared. The standardized procedures begin with preparation of the ore to be tested. As received gold bearing ore was air dried and sieved to two size factors: ½ inch by ¼ inch, and $^-$16 mesh. Test samples totaling 500 grams were prepared by combining 350 grams of the ½ by ¼ inch material with 150 grams of the $^-$16 mesh material. As received copper ore was air dried and sieved to $^-$1/2 inch. The $^-$1/2 inch material was riffled into 500 gram test samples.

The 500 gram test samples were agglomerated in a laboratory drum type agglomerator. 10% moisture addition was used in agglomerating the gold bearing ore, 15% moisture addition was used in agglomerating the copper bearing ore. Testing was conducted under both acidic and alkaline conditions. Acidic conditions were obtained by making down the treatments in water adjusted to a pH of 2.0 with sulfuric acid. Alkaline conditions were obtained by making down the treatments in water adjusted to a pH of 10.7 with lime. Under alkaline conditions, lime or cement was added to the mineral bearing ore to provide alkalinity. The treatment solutions were added to the dry mineral bearing ore with a syringe pump as it was rotating in the drum. Total agglomeration time was five minutes.

After agglomeration, the mineral bearing ore was dried on a 10 mesh sieve for 24 hours at 20° C. and 50% relative humidity. After drying, the samples were subjected to submersion/dispersion testing. The submersion/dispersion testing measures the weight of fines washed from the agglomerates after a 3 minute submersion. The water used for submersion was pH adjusted, using sulfuric acid (pH 2.0) and lime (pH 10.7) for the acidic and alkaline tests respectively.

The agglomeration agents of the present invention comprise cationic copolymers. The cationic copolymers are graft copolymers, block copolymers, or linear copolymers of acrylamide and diallyldimethyl ammonium chloride (DADMAC). Polymers with long sequences of two monomers can be categorized as block copolymers or graft copolymers. In graft copolymers sequences of one monomer are "grafted" onto a "backbone" of the second monomer type, —AAA—AAA—AAA—, etc.
    B      B      B
    B      B      B In block copolymers, synthesis may be controlled to form a copolymer having long sequences of monomers, e.g. A and B, as follows:

AAAA-BBBB-AAAAA-BBBBB-

Graft Copolymers

The graft polymers of the present invention contain polymeric segments obtained from the polymerization of acrylamide and cationic monomers which are attached or "grafted" to another polymer chain which is comprised of the repeating units of one or more monomers. The resulting graft copolymers are soluble in an aqueous medium.

The graft copolymer of the invention has the general structure:

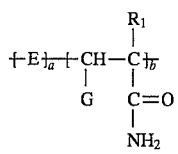

Formula I wherein E in the above formula (Formula I) is the repeat unit obtained after polymerization of an α, β ethylenically unsaturated compound, preferably carboxylic acid, amide form thereof, alkyl (C1–C8) ester or hydroxylated alkyl (C1–C8) ester of such carboxylic acid. Compounds encompassed by E include the repeat unit obtained after polymerization of acrylamide, methacrylamide, acrylic acid, methacrylic acid, maleic acid or anhydride, styrene sulfonic acid, 2-acrylamido-2-methylpropyl sulfonic acid, itaconic acid, and the like. Ester derivatives of the above mentioned acids such as 2-hydroxypropyl acrylate, methyl methacrylate, and 2-ethylhexyl acrylate, are also within the purview of the invention.

The molar percentage of a:b is from about 95:5 to 5:95, with the proviso that the sum of a and b equals 100%.

G in the above formula (Formula I) is a polymeric segment comprising repeat units having the structure:

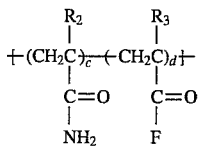

Formula II wherein $R_1$, $R_2$ and $R_3$ in Formulae I and II are the same or different and are hydrogen or a lower alkyl group having $C_1$ to $C_3$. F in the above formula is a salt of an ammonium cation, such as $NHR_3N^+R_{(4,5,6)}$ $M^-$ or $OR_3N^+R_{(4,5,6)}M^-$, wherein $R_3$ is a $C_1$ to $C_4$ linear or branched alkylene group, and $R_4$, $R_5$ and $R_6$ can be selected from the group consisting of hydrogen, $C_1$ to $C_4$ linear or branched alkyl, $C_5$ to $C_8$ cycloalkyl, aromatic or alkylaromatic group; and M is an anion, such as chloride, bromide, or methyl or hydrogen sulfate. Typical cationic monomers are 2-acryloyloxyethyl-trimethylammonium chloride (AETAC), 3-methacrylamidopropyl-trimethylammonium chloride (MAPTAC), 2-methacryloyloxyethyltrimethylammonium chloride (METAC) and diallyldimethylammonium chloride (DADMAC), etc.

It is to be understood that more than one kind of cationic monomer may be present in Formula II.

The molar percentage c:d in Formula II may vary from 95:5 to 5:95, with the proviso, however, that the sum of c and d equals 100%.

There is no limit to the kind and mole percent of the monomers chosen so long as the total adds up to 100 mole % and the resulting copolymers are water soluble.

At present, the preferred water soluble graft copolymer for use as a mineral oil agglomerating agent is:

Formula III

The molar percentage of a:b is from about 95:5 to 5:95, with the proviso that the sum of a and b equals 100%. G in Formula III is:

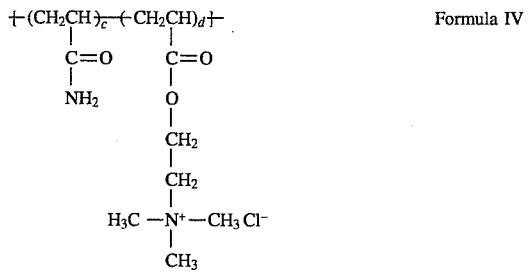
Formula IV

Monomer d is 2-acryloyloxyethyltrimethylammonium chloride (AETAC). The molar percentage c:d in the polymer segment G (Formula IV) is the ratio of acrylamide:AETAC. It may fall within the range between 95:5 and 5:95. The sum of c and d must add up to 100%.

The number average molecular weight ($\overline{Mn}$) of the polymeric segment G is not critical and may fall within the range of 1,000 to 1,000,000. Preferably, the number average molecular weight will be within the range of 5,000 to 500,000, with the range of about 10,000 to about 200,000 being even more desirable. The key criterion is that the resulting graft copolymer be water soluble. A method of preparing the graft copolymers of the present invention is set forth in U.S. Pat. No. 5,211,854, incorporated herein by reference.

Block Copolymers

The block copolymers of the invention useful for mineral ore agglomeration contain a polymeric segment obtained from polymerization of hydrophobic or water insoluble monomers attached to a polymer chain obtained from polymerization of one or more water soluble monomers. The resulting block copolymers are water soluble.

The block copolymers of the present invention have the general structure:

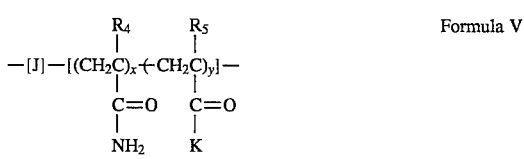
Formula V wherein J is a polymeric segment obtained from the polymerization of hydrophobic or water insoluble monomers. Examples of such monomers include alkyl acrylamides, alkyl methacrylamides, alkyl acrylates, alkyl methacrylates, and alkylstyrenes. Preferably, the hydrophobic monomer is an alkyl acrylate having 4 to about 16 carbon atoms in the alkyl group such as 2-ethylhexyl acrylate. Other suitable hydrophobic or water insoluble monomers include the higher alkyl esters of ethylenically unsaturated carboxylic acids such as alkyl dodecyl acrylate, dodecyl methacrylate, tridecyl acrylate, tridecyl methacrylate, octadecyl acrylate, octadecyl methacrylate, ethyl half ester of maleic anhydride, diethyl maleate, and other alkyl esters derived from the reactions of alkanols having from 8 to 20 carbon atoms with ethylenically unsaturated carboxylic acids such as acrylic acid, methacrylic acid, maleic anhydride, fumaric acid, itaconic acid and aconitic acid, alkylaryl esters of ethylenically unsaturated carboxylic acids such as nonyl-α-phenyl acrylate, nonyl-α-phenyl methacrylate, dodecyl-α-phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; vinyl alkylates wherein alkyl has at least 8 carbons such as vinyl laurate and vinyl stearate, vinyl alkyl ethers such as dodecyl vinyl ether and hexadecyl vinyl ether; N-vinyl amides such as N-vinyl lauramide and N-vinyl stearamide; and aralkylstyrenes such as t-butyl styrene. Of the foregoing hydrophobic monomers, the alkyl esters of acrylic acid and methacrylic acid wherein alkyl has from 4 to 16 carbon atoms, are preferred.

Monomer x, when present, in the Formula V is a nonionic monomer such as acrylamide or alkylacrylamide. $R_4$ and $R_5$ is H or a lower alkyl group having $C_1$ to $C_3$. Monomer y is a cationic monomer. K in the above formula is a salt of an ammonium cation, such as $NHR_6N^+$ $(R_{7,8,9})M^-$ or $OR_6N^+$ $(R_{7,8,9})M^-$, wherein $R_6$ is a $C_1$ to $C_4$ linear or branched alkylene group, and $R_7$, $R_8$ and $R_9$ can be selected from the group consisting of hydrogen, $C_1$ to $C_4$ linear or branched alkyl, $C_5$ to $C_8$ cycloalkyl, aromatic or alkylaromatic group; and $M^-$ is an anion, such as chloride, bromide, or methyl or hydrogen sulfate. Typical cationic monomers are 2-acryloxyethyltrimethyl ammonium chloride (AETAC), 3-methacrylamidopropyltrimethyl ammonium chloride (MAPTAC), 2-methacryloxyethyltrimethyl ammonium chloride (METAC) and diallyl dimethyl ammonium chloride (DADMAC), etc.

The molar percentage x:y of nonionic monomer:cationic monomer, may fall within the range of between 0:100 to 95:5. The molar percentages of x and y must add up to 100%. It is to be understood that more than one kind of cationic monomer may be present in the Formula V.

At present, the preferred water soluble block copolymer is:

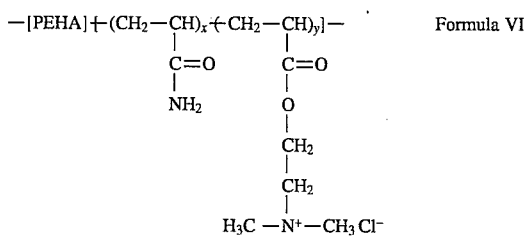
Formula VI wherein PEHA is poly(2-ethylhexyl acrylate). The number average molecular weight ($\overline{Mn}$) of poly(EHA) may fall within the range of 500 to 1,000,000. Preferably, the number average molecular weight will be within the range of 1,000 to 500,000, with the range of about 5,000 to about 200,000 being even more desirable.

In this invention, the preferred monomer x is acrylamide and monomer y is 2-acryloxyethyltrimethyl ammonium chloride (AETAC). The molar percentage of x:y is from about 0:100 to 95:5, with the molar percentage of from about 10:90 to 75:25 being preferred. A method of preparing the block copolymers of the present invention is disclosed in U.S. Pat. Nos. 3,284,393, Re. 28,474 and Re. 28,576, herein incorporated by reference.

Linear Acrylamide/Diallyl Ammonium Chloride

Diallyl dimethyl ammonium chloride (DADMAC) is a quaternary monomer which, when polymerized, yields cationic water soluble polymers.

The copolymerization of acrylamide with DADMAC by a water-in-oil emulsion process is known in the art. For instance, U.S. Pat. No. 3,920,599 discloses the process of preparing the homopolymer of DADMAC and DADMAC/acrylamide copolymers by using 2,2-azobis(isobutyronitrile), benzoyl peroxide, and or lauroyl peroxide.

U.S. Pat. No. 3,968,037 teaches the use of t-butylperoxypivalate to polymerize DADMAC in emulsion.

U.S. Pat. Nos. 4,077,930 and 4,147,681 disclose a process to prepare acrylamide/DADMAC emulsion by using at least 20% by weight, based on the weight of the oil phase, of an emulsifier having HLB (hydrophile lipophile balance) of at least 7.

U.S. Pat. No. 4,439,580 discloses use of free radical initiators such as organic peroxy initiators, redox systems, and azo initiators, i.e., 4,4-azobis-4 cyanopentoic acid and 2,2-azobis (isobutyronitrile) to polymerize DADMAC in emulsion. The preferred initiator is ammonium persulfate (column 3, lines 24–31).

U.S. Pat. No. 4,864,007 discloses the utilization of a cationic azo initiator (water soluble) and phosphorous acid or a derivative as regulator to polymerize DADMAC.

In practice, bench scale testing will allow selection of the most effective cationic copolymer and cement or lime. Such testing is preferred because it was discovered that efficiency was somewhat influenced by the composition of the ore to be treated. Typical treatment rates for cationic polymers range from about 0.05 to about 2.0, preferably about 0.1 pounds active per ton of ore. The cement or lime can be added at treatment rates of from about 1 to 20 pounds per ton of ore.

Testing of a variety of commercially available polyvinyl alcohols, polyethylene oxides, cationic copolymers, and a commercial anionic polymer agglomerating agent in accordance with U.S. Pat. Nos. 5,077,021 and 5,077,022 was undertaken. Table I summarizes the treatments tested.

TABLE I

| Treatment | Trade Name | Description |
|---|---|---|
| A | Airvol 107 | Polyvinyl alcohol, low M.W., fully hydrolyzed |
| B | Airvol 165 | Polyvinyl alcohol, high M.W., super hydrolyzed |
| C | Airvol 205 | Polyvinyl alcohol, low M.W., partially hydrolyzed |
| D | Airvol 350 | Polyvinyl alcohol, high M.W., fully hydrolyzed |
| E | Vinol 540 | Polyvinyl alcohol, high M.W., partially hydrolyzed |
| F | Polyox WSR-N-10 | Polyethylene oxide, low M.W. (~100,000) |
| G | Polyox WSR-N-205 | Polyethylene oxide, high M.W. (~600,000) |
| H | Polyox WSR-N-205 | Polyethylene oxide, medium M.W. (~300,000) |
| I | FlowPro 1512 | Sodium lignosulfonate |
| J | FlowPro 9120 | Anionic polymer (AA/AM) |
| K | Betz Polymer 1175 | Cationic polymer (ADA/DETA/EPI) |
| L | Betz Polymer 2651 | Cationic polymer (DADMAC/AM) |
| M | Betz Polymer 2666 | Cationic polymer (pseudo-star, 50% cationic) |
| N | Betz Polymer 2672 | Cationic polymer (graft, 5% cationic) |
| O | Betz Polymer 2674 | Cationic polymer (graft, 10% cationic) |
| P | Betz Polymer 2676 | Cationic polymer (graft, 20% cationic) |

TABLE II

Gold Ore Agglomeration with 3 lbs. cement/ton ore (pH = 10.7)

| TREATMENTS | | FEED RATES | | % Agglomeration |
|---|---|---|---|---|
| Polymer | Cross-linking Agent | Polymer (lb. Active/Ton) | Cross-linking Agent (lb. Active/Ton) | |
| A | — | 0.25 | — | 0 |
| D | — | 0.25 | — | 74 |
| L | — | 0.25 | — | 76 |
| M | — | 0.25 | — | 42 |
| N | — | 0.25 | — | 87 |
| O | — | 0.25 | — | 87 |
| P | — | 0.25 | — | 80 |
| K | — | 0.25 | — | 0 |
| J | — | 0.25 | — | 94 |
| A | Boric Acid | 0.25 | 0.025 | 0 |
| D | Boric Acid | 0.25 | 0.025 | 63 |
| A | Glyoxal | 0.25 | 0.025 | 0 |
| D | Glyoxal | 0.25 | 0.025 | 63 |

TABLE III

Gold Ore Agglomeration with 2.0 lbs. lime/ton ore (pH = 10.7)

| TREATMENTS | | FEED RATES | | % Agglomeration |
|---|---|---|---|---|
| Polymer | Cross-linking Agent | Polymer (lb. Active/Ton) | Cross-linking Agent (lb. Active/Ton) | |
| A | — | 0.25 | — | 0 |
| D | — | 0.25 | — | 66 |
| L | — | 0.25 | — | 94 |
| M | — | 0.25 | — | 31 |
| N | — | 0.25 | — | 93 |
| O | — | 0.25 | — | 88 |
| P | — | 0.25 | — | 82 |
| K | — | 0.25 | — | 0 |
| J | — | 0.25 | — | 94 |
| A | Boric Acid | 0.25 | 0.025 | 0 |
| D | Boric Acid | 0.25 | 0.025 | 72 |
| A | Glyoxal | 0.25 | 0.025 | 0 |
| D | Glyoxal | 0.25 | 0.025 | 61 |

TABLE II

Gold Ore Agglomeration at pH = 2.0

| TREATMENTS | | FEED RATES | | % Agglomeration |
|---|---|---|---|---|
| Polymer | Cross-linking Agent | Polymer (lb. Active/Ton) | Cross-linking Agent (lb. Active/Ton) | |
| A | — | 0.25 | — | 0 |
| D | — | 0.25 | — | 85 |
| L | — | 0.25 | — | 67 |
| M | — | 0.25 | — | 88 |
| N | — | 0.25 | — | 76 |

TABLE II-continued

Gold Ore Agglomeration at pH = 2.0

| TREATMENTS | | FEED RATES | | % Agglomeration |
|---|---|---|---|---|
| Polymer | Cross-linking Agent | Polymer (lb. Active/Ton) | Cross-linking Agent (lb. Active/Ton) | |
| O | — | 0.25 | — | 69 |
| P | — | 0.25 | — | 80 |
| K | — | 0.25 | — | 0 |
| J | — | 0.25 | — | 0 |
| A | Boric Acid | 0.25 | 0.025 | 0 |
| D | Boric Acid | 0.25 | 0.025 | 48 |
| A | Glyoxal | 0.25 | 0.025 | 0 |
| D | Glyoxal | 0.25 | 0.025 | 60 |

TABLE II

Copper Ore Agglomeration at pH = 2.0

| TREATMENTS | | FEED RATES | | % Agglomeration |
|---|---|---|---|---|
| Polymer | Cross-linking Agent | Polymer (lb. Active/Ton) | Cross-linking Agent (lb. Active/Ton) | |
| A | — | 1 | — | 0 |
| D | — | 1 | — | 0 |
| L | — | 1 | — | 77 |
| M | — | 1 | — | 86 |
| N | — | 1 | — | 82 |
| O | — | 1 | — | 71 |
| P | — | 1 | — | 88 |
| K | — | 1 | — | 0 |
| J | — | 1 | — | 20 |
| A | Boric Acid | 1 | 0.1 | 0 |
| D | Boric Acid | 1 | 0.1 | 27 |
| A | Glyoxal | 1 | 0.1 | 0 |
| D | Glyoxal | 1 | 0.1 | 29 |

Tables II and III indicate that several of the tested cationic copolymers are efficacious in agglomerating gold ore under alkaline conditions relative to treatment J. In Table III, where lime was used to provide alkalinity to the gold ore, treatments L and N were particularly effective.

Table IV shows that all of the cationic polymers with the exception of treatment K were more effective than treatment J in agglomerating gold ore under acidic conditions.

In Table V, polymer feed rates were increased to one pound active per ton of ore. Under these conditions, the agglomeration of low pH copper ore, cationic polymers treatments M and P were the most effective.

While the present invention has been described with respect to particular embodiments thereof, it is apparent that other forms and modifications of the invention will be obvious to those skilled in the art. The appended claims and this invention generally should be construed to cover all such obvious forms and modifications which are within the true spirit and scope of the present invention.

We claim:

1. In a process for percolation leaching of minerals from a mineral bearing ore wherein the ore is first agglomerated with an agglomeration agent, formed into a heap and then leached by percolating a leaching solution through the heap which extracts the minerals from the agglomerated ore for subsequent recovery, the improvement in which the agglomerating agent comprises a cationic copolymer selected from the group consisting of: graft copolymers of the general structure:

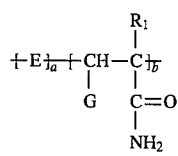

wherein E is the repeat unit obtained after polymerization of an α, β ethylenically unsaturated compound, the molar percentage of a:b is from about 95:5 to 5:95, with the proviso that the sum of a and b equals 100%, G comprises the structure:

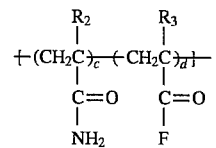

wherein $R_1$, $R_2$ and $R_3$ are the same or different and are hydrogen or a lower alkyl group having $C_1$ to $C_3$, F is the salt of an ammonium cation and the molar percentage of c:d is from 95:5 to 5:95 with the proviso that the sum of c and d equals 100%.

2. The method of claim 1 wherein the ethylenically unsaturated compound is selected from the group consisting of (a) an ethylenically unsaturated carboxylic acid, the amide form thereof, the alkyl ($C_1$–$C_8$) ester thereof, the hydroxylated alkyl ($C_1$–$C_8$) ester thereof and ethylenically unsaturated sulfonic acid.

3. The method of claim 2 wherein the ethylenically unsaturated carboxylic acid is selected from the group consisting of acrylamide, methacrylamide, acrylic acid, methacrylic acid, maleic acid, maleic anhydride, itaconic acid, 2-hydroxypropyl acrylate, methyl methacrylate and 2-ethylhexyl acrylate.

4. The method of claim 2 wherein the ethylenically unsaturated sulfonic acid is selected from the group consisting of styrene sulfonic acid and 2-acrylamido-2-methylpropyl sulfonic acid.

5. The method of claim 1 wherein F is selected from the group consisting of $NHR_3N^+R_{(4,5,6)}M^-$, wherein $R_3$ is a $C_1$ to $C_4$ linear or branched alkylene group, $R_4$, $R_5$ and $R_6$ are selected from the group consisting of hydrogen, $C_1$ to $C_4$ linear or branched alkyl, $C_5$ to $C_8$ cycloalkyl, aromatic or alkylaromatic group, and $M^-$ is an anion selected from the group consisting of chloride, bromide, methyl sulfate and hydrogen sulfate.

6. The method of claim 5 wherein the cationic monomer is selected from the group consisting of 2-acryloyloxyethyltrimethyl ammonium chloride, 3-methacrylamidopropyltrimethyl ammonium chloride, 2-methacryloyloxyethyltrimethyl ammonium chloride and diallyl dimethyl ammonium chloride.

7. The method of claim 1 wherein the graft copolymer has the structure:

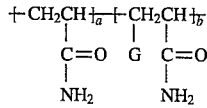

wherein the molar percentage of a:b is from about 95:5 to 5:95, with the proviso that the sum of a and b equals 100%, and G has the structure:

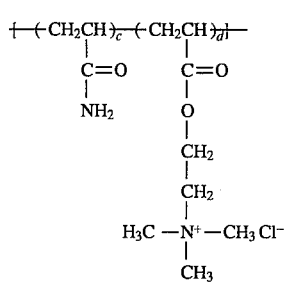

wherein the molar percentage of c:d is from 95:5 to 5:95 with the proviso that the sum of c and d equals 100%.

8. The method of claim 1 wherein the number average molecular weight of G is from about 1,000 to about 1,000,000.

9. The method of claim 8 wherein the number average molecular weight of G is from about 5,000 to about 500,000.

10. The method of claim 9 wherein the number average molecular weight of G is from about 10,000 to about 200,000.

11. The method of claim 1 wherein the copolymer has a number average molecular weight of from about 10,000 to 30,000,000.

12. The method of claim 1 wherein the copolymer has a number average molecular weight of from about 1,000,000 to 30,000,000.

* * * * *